Nov. 17, 1936.  J. R. BOYLE  2,060,848
AIR VELOCITY METER
Filed Dec. 23, 1933   3 Sheets-Sheet 1

Inventor
John R. Boyle
By Brown, Jackson, Boettcher & Dienner
Attys.

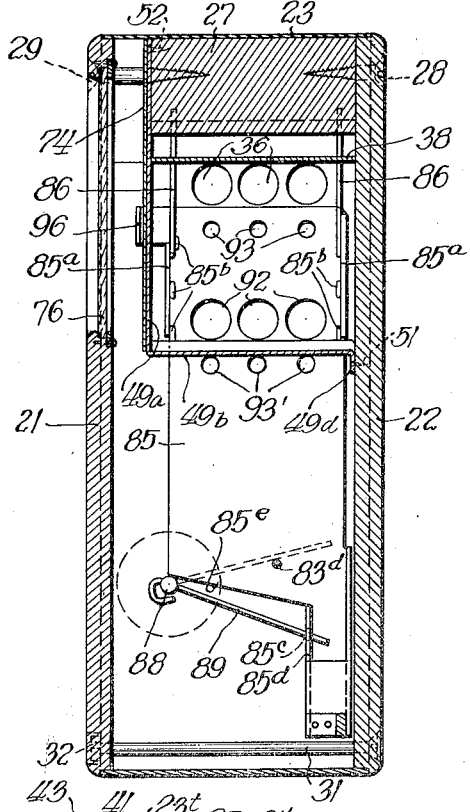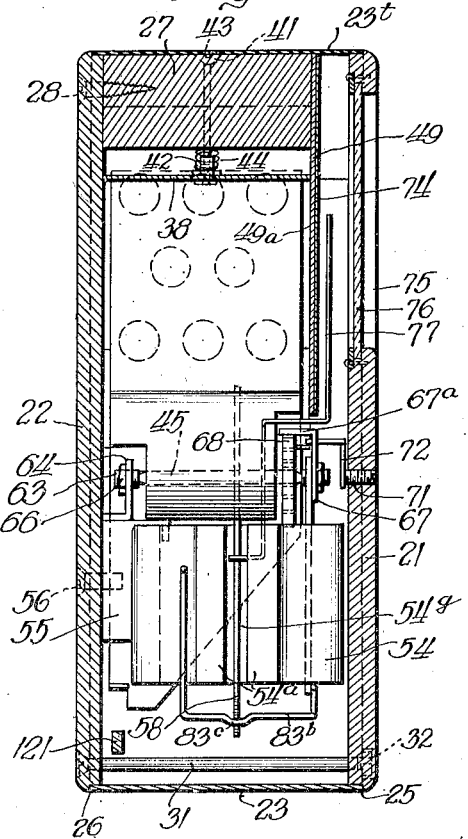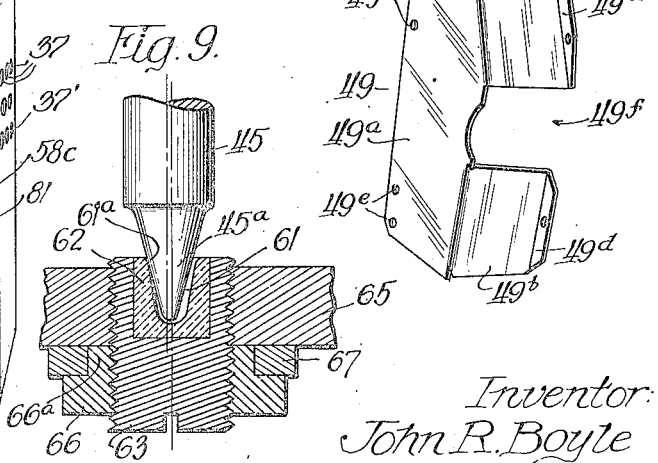

Nov. 17, 1936.   J. R. BOYLE   2,060,848
AIR VELOCITY METER
Filed Dec. 23, 1933   3 Sheets-Sheet 3
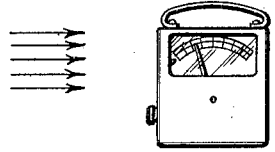
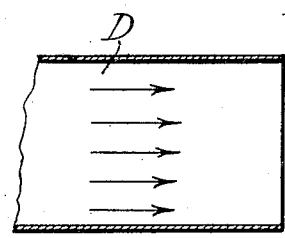
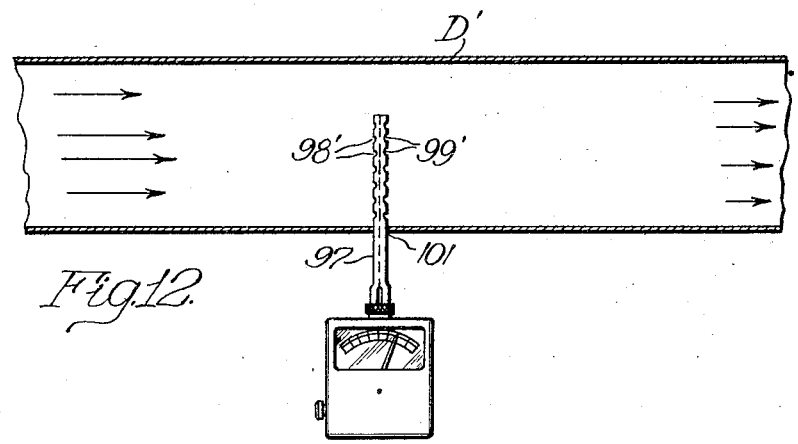
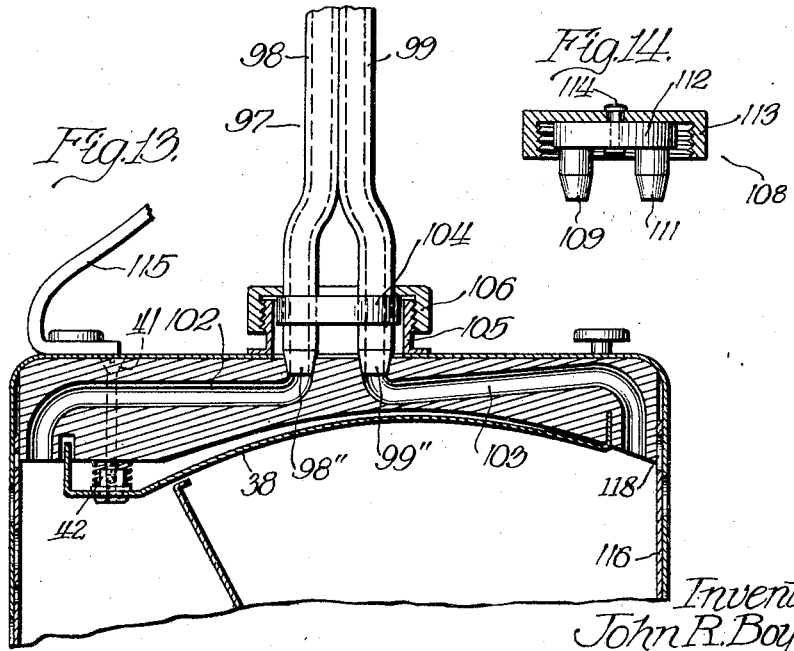
Inventor:
John R. Boyle
By Brown, Jackson, Boettcher & Dienner
Attys.

Patented Nov. 17, 1936

2,060,848

UNITED STATES PATENT OFFICE 2,060,848

AIR VELOCITY METER

John R. Boyle, Chicago, Ill., assignor to Illinois Testing Laboratories, Inc., Chicago, Ill., a corporation of Illinois Application December 23, 1933, Serial No. 703,753

26 Claims. (Cl. 73—202)

REISSUED

The present invention relates to an air velocity meter.

One of the principal objects of the invention is to provide an improved construction of small, compact, portable meter which can be conveniently carried from place to place for measuring air velocities. In this regard, it is a further object of the invention to provide an improved meter which is constructed and balanced for accurate operation in any plane, i. e., it can be held or set vertically, horizontally, or at any intermediate angular position for measuring the velocity of an air stream flowing in any direction. This feature is of decided advantage for enabling one to determine accurately the angle or direction of a low velocity air flow by merely comparing readings with the instrument held at different angles.

Another object of the invention is to provide an improved construction of meter of extreme sensitivity, capable of accurately measuring air currents of very low velocities. For example, meters which I have heretofore constructed embodying my invention are capable of accurately measuring such very feeble air currents as may be induced in the free air of a room by heated air rising from a radiator, or as may be set up by window ventilation or by conditioned air circulated through the room by air conditioning ducts. Thus, my improved meter is of marked utility for heating and ventilating engineers, in that it enables accurate determination to be made of the direction and velocity of air currents in different parts of a room or other enclosure, and to determine the velocities of air currents passing through inlet or exhaust ducts associated with an air conditioning system, etc.

Another object of the invention is to provide a meter of the above characteristics which is also rugged and durable so that it can withstand without injury the most severe shocks and jars to which a portable instrument is ordinarily subjected. In this regard, it is an object of the invention to provide improved means which is operative when the meter is not in use to impose a locking force on the moving system so as to prevent movement thereof, and which is also operative to relieve relatively delicate bearings of the load of the moving system so that jar or shock will not injure these bearings or other parts. The efficacy of this improved construction has been demonstrated by meters constructed in accordance with my invention which have been dropped from the height of a table without injury.

My improved meter is preferably constructed as a direct reading instrument calibrated to indicate directly the air velocity in feet per minute, and it is another object of the invention to provide improved damping means which will prevent objectionable oscillation or fluttering of the indicating pointer when reading rapidly pulsating air currents. The prior direct reading meters with which I am familiar have utilized air vanes and other like damping devices, but these damping devices do not prevent the aforesaid objectionable oscillation of the indicator, which oscillation may be so wide and rapid under some conditions as to make the reading of the instrument impossible. This has been completely avoided in my improved construction by employing improved magnetic damping means which results in the meter giving substantially a dead beat indication even when operating under the most adverse conditions. In my improved meters embodying this magnetic damping means, the indication established by the meter in the case of a rapidly pulsating air flow is substantially the mean of the different velocities; although the indicator is capable of following such slow surges or changes in velocity as can be read directly without inconvenience.

Another object of the invention is to provide an improved construction which will enable the meter to be used in measuring widely different air velocities. This object is preferably attained by providing a construction which will enable the pointer to indicate velocities on either one of two different scales calibrated to embrace different ranges of velocities.

Another object is to provide an improved construction of bearing for the movable system of the meter.

Another object is to provide improved means for balancing the moving system in different planes.

Another object is to provide an improved formation and construction of channel or orifice in which the velocity responsive vane of the meter swings; also to provide an improved channel or orifice capable of adjustment in size or shape.

Another object is to provide improved attachment means for enabling the meter to measure the air or gas velocity within a closed duct or pipe. This attachment apparatus comprises tubes which can be inserted through a hole in the side of the main air or gas duct, and which tubes communicate at their other ends with the meter. Thus, the instrument may be readily converted into a flow meter adapted for measuring the velocity of an air or gas within a closed conduit through the instrumentality of Pitot tubes or the like. In this regard, while most of the aforementioned features of my invention have greatest utility in a portable air velocity meter such as I have described, nevertheless it will be understood that some of these features can be embodied with advantage in stationary flow meters and other like instruments for measuring the volume or velocity of a fluid flow. Accordingly, my invention is not to be limited in its entirety to a portable, air velocity meter.

Other objects and advantages of my invention will appear from the following detail description of a preferred embodiment thereof. In the accompanying drawings illustrating such embodiment:—

Figure 5 is a transverse sectional view taken approximately on the plane of the line 5—5 of Figure 4 and looking in the direction indicated by the arrows;

Figure 6 is a view taken approximately on the same plane, but looking in the opposite direction, as indicated by the arrows 6—6;

Figure 7 is a perspective view looking at the open front of the instrument, but with the plate which defines the bottom and front side of the air channel removed;

Figure 8 is a perspective view of this plate;

Figure 9 is a detail sectional view of one of the improved bearings for the moving system;

Figure 10 is a diagrammatic view illustrating the use of the instrument for measuring the velocity of unconfined or ambient air;

Figure 11 is a similar view illustrating the use of the instrument for measuring the velocity of an air stream issuing from a duct;

Figure 12 is a diagrammatic view illustrating the use of the instrument for measuring the velocity of an air or gas flow through a duct;

Figure 13 is a fragmentary sectional view showing one arrangement by which my improved meter can be employed for the use illustrated in Figure 12; and Figure 14 is a detail sectional view of a closure cap which is adapted to be substituted for the Pitot tube extension when the instrument is to be converted back to ordinary portable use.

Figure 2:
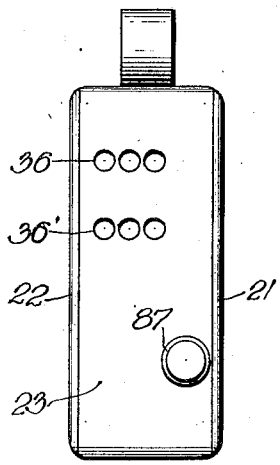
Figure 2 is a side elevational view, illustrating the side through which the air stream enters the instrument.

In the embodiment illustrated, the meter parts are enclosed within a housing comprising front and back cover plates 21 and 22. The perimetrical portion of the housing comprises a sheet metal strip 23 bent into the form of an open rectangular frame and having its ends secured together as indicated at 24. The front and back cover plates 21 and 22 have grooves 25 and 26 formed around their inner edges for receiving the edge portions of the sheet metal strip 23. A block 27, serving primarily for mounting or attachment purposes, is extended across the upper portion of the housing, substantially from side to side thereof, this block being of lesser depth than the depth of the casing, as illustrated in Figures 5 and 6. This block is secured fast against the back cover plate 22, the cover plate and block being fastened together by the screws 28 (Figs. 5 and 6). The front cover plate 21 is detachably secured in place by screws 29, which pass through the upper corners of said cover plate and thread into the block 27. The lower corners of the front and back cover plate are connected by screws 31 extending through both plates and receiving nuts 32 on their rear ends. It will be understood that the housing can be constructed in other ways than that above described. For example, the back 22, the peripheral portion 23 and the mounting block portion 27 may be molded as a unitary piece, composed of a phenolic condensation product, or aluminum or any other preferred material.

Defined below the block 27 is the air channel or passageway 34 in which the air vane 35 oscillates in response to the velocity of the air passing through said channel. The air entering the channel passes through upper and lower apertures 36, 36' provided in the lefthand vertical side 23l of the sheet metal frame structure 23. The air leaving the channel or passageway 34 passes out through a somewhat similar arrangement of apertures 37, 37', 37" provided in the righthand wall 23r of this sheet metal casing portion 23. As I shall hereinafter describe, shutters are preferably associated with these different sets of holes for restricting one of the sets and for closing both of the sets.

Figure 1:
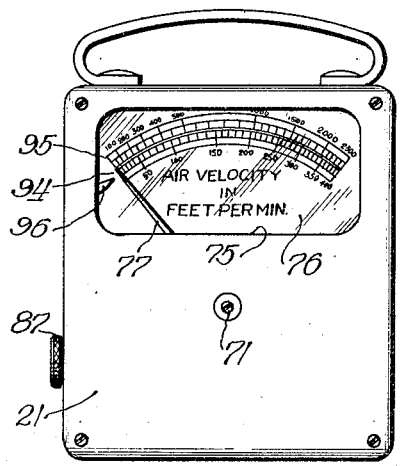
Figure 1 is a front elevational view of the improved instrument.
Figure 3:
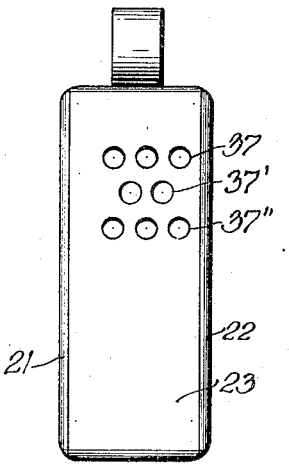
Figure 3 is a similar view of the opposite side, illustrating the side from which the air stream is discharged from the instrument.

The top wall of the air channel 34 is defined by an adjustable member 38 preferably constructed in the form of a sheet metal strip having its righthand end fixedly secured to the attachment block 27, as by having the end of this strip bent upwardly and secured to the top of the block around the end thereof; or such attachment may be effected in any other desired manner. The other end of the sheet metal strip 38 is arranged so that it can be adjusted upwardly or downwardly to vary the size and shape of the air channel 34. This adjustment is effected by a screw 41 which passes down through the mounting block 27 and has its lower end threading through a threaded bushing 42 which is suitably anchored to the top side of the strip 38. The left extremity of the strip 38 is left free so that it can move up and down in the adjustments effected by the screw 41. The head of the screw 41 is accessible through an aperture 43 in the top wall 23t of the sheet metal housing portion. This hole 43 may be smaller than the head of the screw 41 so as to hold the screw against upward movement, the screw being mounted in the block 27 before said block is enclosed within the perimetrical housing portion 23. If desired, a compression spring 44 may encircle the screw and the threaded bushing 42, such spring thrusting the strip 38 downwardly to the adjusted position established by the screw 41. The air vane 35 swings about the axis of a pintle or arbor 45, the arc 46 designating the path of movement of the upper edge of said vane. When the vane is in its zero position, it lies substantially in the full line position illustrated in Fig. 4. Directly above the arc 46, the under side of the sheet metal strip 38 is formed with a curvature 47 extending substantially from this zero position of the vane to the righthand extremity of the air channel 34. The curve 47 may be a true arc or may be a parabola or other generated curve, depending principally on the manner in which it is desired to subdivide the indicating scale on the instrument. With the scale graduated as shown in Figure 1, I preferably form the curve 47 as a true arc. The relation between the arc 46 of the vane and the curve 47 is such that an aperture a is constantly defined between these curves, this aperture being of minimum height when the vane is in its zero position, and constantly increasing in height and size as the vane swings towards its position of maximum air velocity. The adjustment afforded by the screw 41 enables the size of the aperture a to be increased or decreased with the vane disposed in its zero position. Such adjustment also enables the height and shape of the curve 47 to be varied for securing scale corrections.

The bottom of the air channel or passageway 34 is defined by a plate 49, illustrated in perspective in Figure 8. This plate comprises a vertical front portion 49a from which the bottom wall portions 49b and 49c are bent rearwardly. Attaching flanges 49d are bent downwardly from the rear edges of the bottom wall portions 49b, 49c. Screws or other suitable fastening members 51 pass through apertures in these flanges 49d and engage in the back cover plate 22. The vertical front portion 49a is provided with apertures 49e for receiving screws 52 which fasten in the attachment block 27. An aperture 49f is provided between the bottom wall portions 49b and 49c, and the vane 35 extends upwardly through this aperture. The lower portion of the vane is formed with a cylindrically curved portion 35a which is arranged just out of contact with the inner edge 49g of the bottom wall portion 49b. The very narrow slot affording mechanical clearance between this edge and the curved portion 35a remains of the same size throughout the entire throw of the vane so that the leakage around the under side of the vane at this point is maintained at a constant throughout the entire movement of the vane. The slope of the bottom wall portions 49b and 49c, substantially as shown, accommodates a greater range of movement of the vane and affords other advantages. The front wall of the air channel 34 is defined by the vertical front portion 49a of the plate 49, and the back wall of the air channel is defined by the rear cover plate 22, the front and rear edges of the vane being spaced slightly from these walls, as illustrated in Figure 6.

Mounted horizontally in the lower portion of the casing is a U-shaped permanent magnet 54. The mounting of said magnet is preferably established through a bracket 55 (Figure 6) which is secured to the back cover plate 22 by screws 56. The bracket 55 is secured to the side of the magnet by lugs, screws or soldering. In the preferred embodiment shown, the moving system of the meter is mounted on the magnet 54 and bracket 55, although it will be understood that different arrangements of mounting brackets may be employed. The moving system comprises the vane 35, curved lower portion 35a, spindle 45, and damping segment 58. The lower end of the curved portion 35a is formed with an inwardly extending tongue portion 35b which is crimped around the spindle 45, or otherwise fixedly secured thereto. The damping segment 58 is disposed to swing between the closely disposed pole extremities of the magnet 54, as best shown in Figure 7. This segment has an upwardly extending tongue portion 58a which is apertured for permitting the spindle 45 to pass therethrough. Said tongue passes through a slot 35c in the lower portion 35b of the vane, and continues upwardly to have its upper extremity anchored in a notch 35d which is cut in the vane at the upper end of the curved portion 35a. This attachment of the damping segment to the vane stiffens the segment against lateral deflection or possible bending under jar. The vane structure 35, 35a, 35b and the damping segment 58, 58a are both preferably constructed of aluminum, although they may be made of other materials, if desired.

Figure 4:
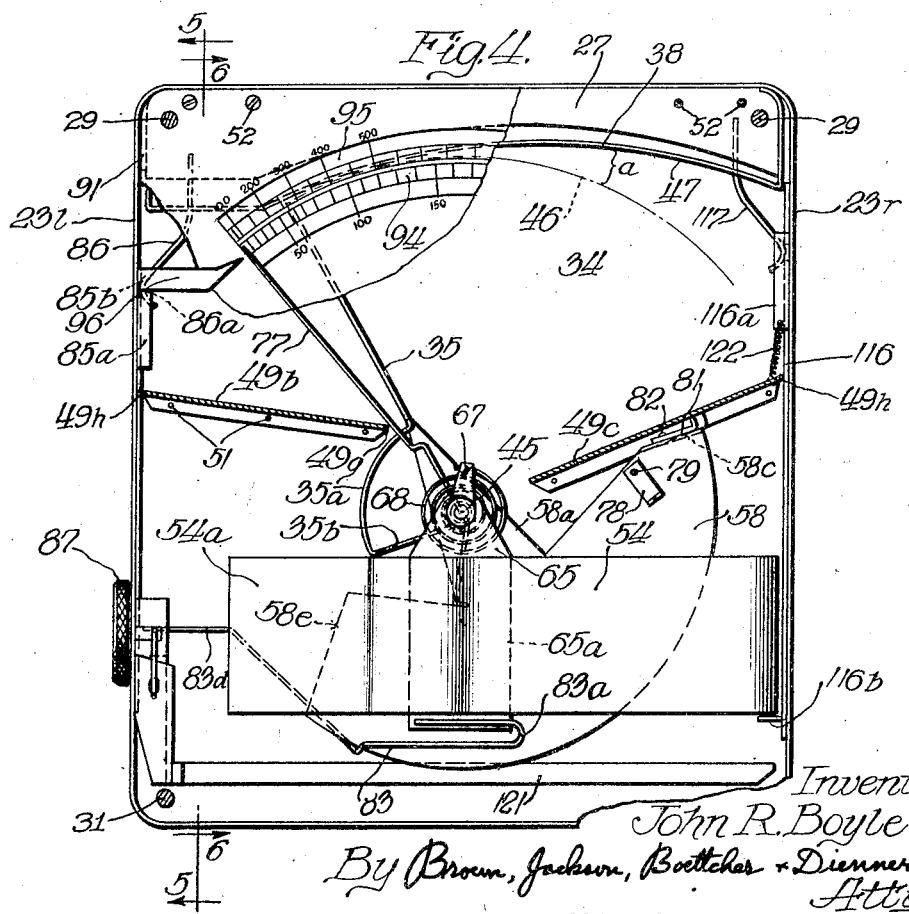
Figure 4 is the front view with the front cover removed, and some of the parts illustrated in section.

The opposite ends of the spindle 45 are formed with pointed extremities 45a, as illustrated in the enlarged section of Figure 9. These extremities extend into tapered sockets 61 formed within jewel bearings 62 which are mounted within the bearing bushings 63. In the preferred construction of these bearings, the socket 61 is formed on a more gradual taper than the spindle extremity 45a so that the bearing contact occurs primarily at the larger end of the socket, substantially at the point indicated at 61a. This portion of the socket is slightly larger than the adjacent portion of the spindle extremity so that the spindle can be moved upwardly to contact with the top portion of the socket 61 when the weight of the moving system is taken off of the bearings. The bearing construction is the same at both ends of the spindle. The rear bearing bushing 63 screws through a bracket 64 which is attached either to the mounting bracket 55 or to the upper edge of the magnet 54 (see Fig. 7). The front bearing bushing 63 screws through a front bearing bracket 65 which is suitably fastened to the front leg of the magnet 54. Referring again to Figure 9, a lock nut 66 screws over the outer end of the bearing bushing 63 and abuts against the outer side of the bracket 65. This lock nut has an annular shoulder or boss 66a projecting inwardly therefrom. Said shoulder or boss defines an annular bearing for an arm 67 (Figure 6) which is pivoted to oscillate about the axis of the spindle on said boss. The swinging end of this arm is provided with an inwardly projecting extremity 67a, and to this extremity is suitably fastened the outer end of the hair spring 68. The inner end of the hair spring is suitably secured to the spindle 45. The hair spring is preferably arranged as shown in Figure 4, whereby the convolutions of the spiral are wound up as the vane 35 swings to the right, although this arrangement of the hair spring is not essential. The tension of the hair spring can be increased or diminished for the purpose of accurately setting the pointer on its zero position, by the rotation of a small screw 71 which has threaded mounting in the front cover plate 21, and the front of which screw is accessible from the front of the instrument. The rear end of this screw has an L-shaped arm 72 secured thereto (Figure 6), and the inwardly projecting end of this arm or lever extends through an aperture in the arm 67, whereby rotation of the screw 71 is operative to oscillate the arm 67 and thereby increase or decrease the tension on the spring 68.

The dial is printed on a card or plate 74, which is suitably secured to the front side of the vertical wall portion 49a of the plate 49. The dial markings are visible through a sight window 75 provided in the front cover plate 21. A glass 76 is mounted in this sight window 75. The pointer 77 consists of a rod or wire which is secured to the movable system in any suitable manner, preferably by bending a portion of the rod inwardly below the vertical wall 49a, then passing the rod downwardly through an aperture in the curved vane extension 35a and through an aperture in the spindle 45, and then bending the extremity of the rod inwardly to seat in a notch in the lower portion of the damping segment extension 58a, as shown in Figures 6 and 4.

Devices are provided for adjusting the balance or center of mass of the moving system in two different directions. Referring to Figures 4 and 7, one of these devices consists of a small angle-shaped clip or arm 78 which is pivoted at 79 to the vertical front face of the damping segment 58, preferably at a point adjacent to the outer or righthand tail of this segment. By grasping the projecting free end of this balancing member 78 and oscillating the same in one direction or the other the center of gravity can be shifted in one line of direction. The adjacent end of the damping segment 58 is provided with a laterally bent flange 58c. Another balancing device 81 of similar formation is pivotally connected at 82 to this flange 58c, said latter balancing device being capable of pivotal adjustment in a plane defined by the top surface of the flange 58c and affording center of gravity adjustment in another line of direction. By shifting the position of one of these two adjustable balancing members the center of gravity of the moving system can be shifted in one direction, as for instance vertically towards or away from the horizontal plane of the pivot axis; and by shifting the position of the other balancing member the center of gravity can be shifted in another direction, as for instance horizontally towards or away from the vertical plane of the pivot axis. Convenient access may be had to these adjustable balancing members 78 and 81 by merely removing the front cover plate 21.

The concentrated flux field of the magnet 54 is primarily in the narrow gap 54g defined between the closely disposed pole extremities 54a of the magnet. Referring to Figure 4, I have found it preferable to shape and arrange the adjacent edge of the damping segment 58 substantially as shown, with the diagonal edge 58e of the segment intersecting a limited portion of this concentrated flux field when the pointer 77 is in its zero position. Certain advantages accrue to this formation of the adjacent edge of the damping segment and to this relation of the segment to the concentrated flux field. For instance, the restoring forces which are necessarily exerted by the balance of the moving system and by the tension of the hair spring, for the purpose of returning the pointer to zero position, can be reduced to a minimum or can be made practically nil when the pointer arrives in its zero position, because the magnetic damping action is exerting very little motion retarding force substantially at the time that the pointer is approaching or arriving at its zero position. On the other hand, as soon as the vane 35 starts its oscillation to the right in response to a current of air, the damping action becomes increasingly effective as the diagonal edge 58e of the damping segment swings upwardly through the concentrated flux field, whereby a maximum damping action is effective at the higher air velocities.

The device for imposing a locking and elevating force on the moving system when the meter is not in use comprises a resilient wire 83 which has a U-shaped resilient loop 83a at one end, as shown in Figure 4. The front bearing bracket 65 has an extension portion 65a projecting downwardly on the inner side of the magnet 54, and the upper end of the loop 83a is soldered or otherwise suitably secured to the lower end of this extension portion 65a. The wire is bent to have a rearwardly extending portion 83b passing below the circular outer periphery of the damping segment 58 (Figure 6), and this portion of the wire has a U-shaped bend 83c therein for engaging the peripheral edge of the segment. The wire continues diagonally upwardly and to the left, as indicated at 83d, for attachment to the shutter which controls the lefthand apertures 36, 36'. When the latter shutter is in either of its open positions for permitting the passage of air through the channel 34, the wire is pressed downwardly to remove all restraint from the damping segment 58, but when the shutter is moved upwardly to its closed position, the wire is carried upwardly thereby to impose an upward force against the bottom edge of the damping segment, thereby locking the moving system against motion and also lifting the moving system so that the weight thereof is not carried by the tapered spindle ends 45a and bearing jewels 62. When the moving system is thus locked against motion, and its weight removed from the bearings, it is capable of withstanding very severe jars.

The shutter which controls the inlet apertures 36, 36' comprises a plate 85 which is arranged for vertical sliding movement along the inner side of the lefthand housing wall 23l. The plate has laterally bent stiffening flanges 85a along its vertical margins. Suitable provision is made for guiding the plate for vertical sliding movement, which guiding arrangement may be of any desired form, although in the preferred construction shown I have illustrated resilient rods or wires 86 which have their upper ends anchored in the mounting block 27 (Figure 5) and which have their lower ends pressing frictionally against the inner surface of the plate at points just inside of the marginal stiffening flanges 85a, where the rods serve to guide the vertical motion of the plate. Referring to Figure 4, said rods are formed with hump-shaped or rounded lower ends 86a which are adapted to snap into slots 85b in the plate when the latter is in either one of its three positions, which action can be felt in the movement of the slide plate, from which it will be seen that these rods also serve as detent means or indicating means for indicating when the slide plate 85 is in each of its three positions and for resiliently retaining it in that position. The outer edge 49h of the bottom wall portion 49b can also be used to assist in guiding the motion of the shutter plate 85. The plate is reciprocated by the rotation of a thumb wheel 87 which is mounted at the lefthand side of the instrument. A shaft 88 projects from this wheel through the housing wall 23l and has a rod 89 anchored to its inner end and projecting rearwardly therefrom. Said rod extends through an aperture 85c which is provided in a flange 85d projecting from the lower portion of the shutter plate. Rotation of the thumb wheel 87 is thus operative to reciprocate the shutter plate upwardly or downwardly. The downward motion thereof is limited by the lower diagonal edge 85e of the plate engaging the thumb wheel shaft 88. The upper edge of the plate is adapted to slide up into a recess 91 between the attachment block 27 and casing wall 23l, and the upward motion of the plate is limited by the engagement of said plate with the top of this recess 91. Provided in the plate 85 is a row of relatively large apertures 92, as large as the apertures 36, 36' in the casing wall, and upper and lower rows of relatively small apertures 93 and 93'. The apertures in the shutter plate and in the casing wall are so related that when the shutter plate is in the lowermost position, as illustrated in Figure 5, the top edge of the plate is below the upper row of casing apertures 36 and the row of shutter apertures 92 is in registration with the lower row of casing apertures 36'. This leaves the casing apertures entirely unobstructed, for a maximum flow of air therethrough. When the shutter plate is moved upwardly to its intermediate position, as determined by the action of the detent humps 86a snapping into the intermediate apertures 85b, the top row of small shutter apertures 93 is brought into registration with the top row of casing apertures 36 and the bottom row of shutter apertures 93' is brought into registration with the bottom row of casing apertures 36'. This reduces the total effective area of the openings through which the air can enter the instrument, such area bearing a predetermined relation to the total effective area of the casing apertures 36, 36' when unrestricted, whereby the instrument can be used to measure air velocities which would exceed the capacity of the instrument if the air flow were through the unrestricted casing apertures 36, 36'. When the shutter plate is raised to its uppermost position, the solid portion of the plate directly below the top row of small apertures 93 closes the top row of casing apertures 36 and the solid portion of the plate below the bottom row of small apertures 93' closes the bottom row of casing apertures 36'. Hence, the meter is completely closed against the inflow of air at this time. When the meter is placed in this inoperative condition, the resilient wire 83 is caused to engage the peripheral edge of the damping segment 58 and thereby lift and lock the moving system to place the moving system in inoperative condition as well. This is accomplished by extending the end 83d of the lifting spring into an aperture in the lower portion of the shutter plate 85, as shown in Figure 5, whereby the lifting spring is caused to move upwardly against the peripheral edge of the damping segment when the shutter slide is in its uppermost position.

The dial 74 is provided with two concentric scales 94 and 95, so arranged that the pointer 77 swings over both scales. The inner scale 94 is shown as being calibrated to read from 0 to 400 feet per minute, and is the scale which is read when the inlet apertures 36, 36' are opened wide, corresponding to relatively feeble air currents. The outer scale 95 is calibrated to read from approximately 0 to 2500 feet per minute, and is the scale which is read when the air enters through the restricted apertures 93, 93', corresponding to relatively high air velocities. A tongue 96 is bent laterally from the forward edge of the shutter plate 85 in position to extend over the front of the dial 74, this tongue moving up and down with the shutter plate and serving as an indicator for designating whether the inner scale 94 or the outer scale 95 is to be read. It will be apparent that the indicator is in position to designate the inner scale 94 when the apertures 36, 36' are unrestricted, and will be in position to designate the outer scale 95 when the air flow is through the restricted apertures 93, 93'.

Figure 10 diagrammatically illustrates the use of the meter for measuring the velocity of an unconfined air flow, such as the circulation of air in a room or enclosure. By reason of the straight through flow of the air in the instrument—its entrance through the inlet apertures 36, 36' at one side of the casing, its substantially straight line flow through the channel 34, and its discharge through the outlet apertures 37, 37', 37" at the opposite side of the casing—the instrument is made more efficient and more sensitive and can be used to better advantage for determining accurately the direction of an unconfined air flow by merely tilting or turning the instrument to different angular positions and noting any variation in the readings. The substantially straight line flow of the air through the instrument, as distinguished from a sinuous, tortuous or reversing path, greatly reduces the inertia losses and side wall air friction. By minimizing these losses, and particularly the inertia losses, the maximum kinetic energy of very feeble air currents is imparted to the vane. It will be noted from Figure 6 that the vane closes almost the entire cross-sectional area of the channel when in its zero position, there being only small clearance areas between the channel walls and the side and top edges of the vane. It will also be noted from Figure 4 that in all positions of the vane it closes the major cross-sectional area of the channel. These factors greatly increase the sensitivity and accuracy of the instrument to low velocity air flows.

Figure 11 diagrammatically illustrates the use of the instrument for determining the velocity of an air current issuing from a duct D. In each of the uses illustrated in Figures 10 and 11, the outlet or discharge apertures 37—37" at the outlet side of the casing are maintained open.

Figure 12 diagrammatically illustrates the use of a modified form of my improved meter for measuring the velocity of an air or gas flow occurring within a closed duct D'. In adapting the meter to this utility, an attachment 97 is connected with the meter for conducting the air or gas from the duct D' through the meter and back into the duct. This attachment comprises two pipes 98 and 99 having apertures 98' and 99' in their upper ends. The apertures 98' are arranged to face in opposition to the direction of the flow and the apertures 99' are arranged to face in the direction of flow, whereby the pipes 98 and 99 function in the manner of Pitot tubes or pressure tubes for conducting a portion of the flow down through the meter. The two pipes are perferably arranged back to back so that they can be inserted through a relatively small aperture 101 in the wall of a duct D'. The lower ends of the two pipes are spread apart, as illustrated in Figure 13, and these ends have tapered extremities 98" and 99" for effecting tight seating in the upwardly directed ends of the two passageways 102 and 103. A circular collar 104 is secured fast to the separated lower portions of the two pipes and is adapted to fit within a circular, threaded boss 105 which is secured to the top of the meter housing. A clamping nut 106 is arranged to screw down over the boss 105, this nut having an inwardly extending flange which overlies the edge of the collar 104. It will be evident that by screwing this nut 106 downwardly, the tapered extremities of the two pipes can be forced into tight seating contact with the ends of the passageways 102, 103. When the pipe attachment 97 is disconnected from the instrument, the upper ends of these passageways are closed by a closure attachment 108, illustrated in Figure 14. The latter comprises two solid plugs 109 and 111 extending down from a block 112 and adapted to seat in the upper ends of the passageways 102, 103 for closing the same. A screw cap 113 has swiveled connection with the block 112 through the swivel pin 114, whereby the screw cap can be screwed downwardly over the threaded boss 105 for forcing the plugs 109, 111 down into the passageways. When an instrument of the construction illustrated in Figures 12 and 13 is provided with a top carrying strap 115, one end of the strap is made releasable to facilitate connecting the attachment 97 to the instrument.

The two passageways 102, 103 are formed within the mounting block 27 and communicate with the inlet and outlet ends respectively of the air channel 34. The adjustable top wall 38 of the air channel is preferably arranged so that these passageways open into the channel beyond the ends of said adjustable top wall. When thus employing the instrument in conjunction with the attachment 97 for measuring the velocity of a flow within a closed conduit, it is desirable that the outlet apertures 37, 37', 37'' in the righthand side of the casing be closed. This is accomplished by the provision of a shutter plate 116 which is arranged for sliding movement inside of the righthand casing wall 23r, corresponding substantially to the slidable arrangement of the shutter plate 85 at the opposite side of the casing. For example, the plate 116 may be provided with laterally extending marginal flanges 116a which cooperate with spring rods 117 for guiding the motion of the plate, similarly to the guiding relation previously described between the flanges 85a and the spring rods 86. The plate 116 is provided with three rows of relatively large apertures 118 which are adapted to register with the three rows of casing apertures 37, 37', 37'' when the plate is in its lower position. The movement of the plate to its upper position closes all rows of casing apertures. Such movement is effected by an arm 121 which extends across the casing adjacent to the bottom thereof. The lefthand end of this arm is rigidly secured to the lower portion of the shutter slide 85 so as to move directly therewith. The arm is disposed adjacent to the back wall of the casing, as shown in Figures 5 and 6, so that it can have the required range of movement in a plane in back of the permanent magnet 54. The righthand end of said arm is adapted to engage a flange 116b which is punched laterally from the lower portion of the shutter plate 116. One or more tension springs 122, connected between the flanges 116a and the bottom wall portion 49c, normally tend to pull the shutter slide 116 down to its open position. The arrangement is such that the latter slide will remain in this open position, with the outlet apertures 37, 37', 37'' completely open, as long as the inlet shutter 85 is either down in its wide open position or in its intermediate restricted position with the restricted apertures 93, 93' in register with the casing apertures. However, as soon as the inlet opening shutter 85 is moved upwardly to its completely closed position, the corresponding upward movement of the arm 121 will effect engagement with the flange 116b and move the outlet shutter 116 up to its closed position, thereby closing both sides of the casing. As soon as the inlet shutter is moved back to its intermediate position or to its lower position, the springs 122 restore the outlet shutter 116 to its open position. Thus, the two shutters are capable of completely closing the instrument housing, which is particularly desirable when the instrument is to have the attachment 97 adapted thereto for measuring the velocity of a flow through a closed conduit, as illustrated in Figure 12. Even where the instrument is not intended or designed for this latter adaptability, the closing of the outlet apertures 37, 37', 37'', when the instrument is locked against operation, is of advantage for preventing any possibility of the vane 35 being subjected to any air pressure. In the modified construction adapted for the use of the attachment 97, the locking wire 83 may be dispensed with so that the moving system is still movable with both shutter slides elevated to their closed positions; or this locking wire is retained by giving each of the slides still another higher position, beyond the closed positions, in which higher position the casing will still be closed and the wire will be brought into action for locking and elevating the moving system.

I have found that the magnetic damping mechanism, constructed and arranged substantially as herein described, is efficacious to dampen the motion of the moving system when low velocity air currents are admitted through the unrestricted apertures 36, 36' or when the restricted apertures 93, 93' are interposed for higher velocity currents. The eddy currents that are set up in the damping segment 58 upon any tendency of the segment to oscillate quickly, oppose sufficient retarding force to such quick motion that a dead beat indication is obtained even when the air velocities are rapidly pulsating. In the case of a rapidly pulsating air flow, the indication is substantially the mean of the different velocities. This magnetic damping operation creates no frictional retardation and does not decrease the sensitivity of the instrument. Also, this magnetic damping operation enables the indicating pointer to follow such slow surges or changes in velocity as can be read directly without inconvenience, which is often desirable.

While I have illustrated and described what I regard to be the preferred embodiment of my invention, nevertheless it will be understood that such is merely exemplary and that numerous modifications and rearrangements may be made therein without departing from the essence of the invention.

I claim:—

1. In an air velocity meter of the class described, the combination of a casing, an air channel defined in said casing for directing an air flow therethrough, a moving system comprising a vane, indicating means and a balancing segment, said vane extending into said air channel in position to be deflected through a limited range of oscillatory movement by the velocity of the air flow through said channel, said indicating means indicating the range of deflection of said vane, said balancing segment depending below said vane and lying substantially at right angles thereto and balancing said vane and indicating means, and a permanent magnet comprising pole extremities defining an air gap, said balancing segment moving through said air gap.

2. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, a moving system comprising a vane, indicating means and a balancing segment, said vane extending into said air channel in position to be deflected through a limited range of oscillatory movement by the velocity of the air flow through said channel, said indicating means indicating the range of deflection of said vane, said balancing segment depending below said vane and lying substantially at right angles thereto and substantially balancing said vane and indicating means, and a permanent magnet comprising pole extremities defining an air gap, said balancing segment moving through said air gap.

3. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, a moving system comprising a vane, indicating means and a damping segment, said moving system being pivoted for oscillatory movement about an axis extending substantially at right angles to the direction of flow of the air through said channel, said vane extending into said channel and being disposed substantially transversely thereof in position to be deflected through a limited range of oscillatory movement by the velocity of the air flow through said channel, said indicating means indicating the range of deflection of said vane, said damping segment depending below said vane and lying substantially at right angles thereto, and permanent magnet means comprising pole extremities defining an air gap, said damping segment moving through said air gap.

4. In a portable air velocity meter of the class described, the combination of a substantially rectangular casing which can be held in the hand or rested on a supporting surface for operation, inlet and outlet openings in opposite side walls of the upper portion of said casing, an approximately horizontal air channel in the upper portion of said casing extending in a substantially straight line between said openings, whereby said openings can be aligned with free atmospheric air currents and said currents can have substantially unidirectional flow through said casing, a spindle in said casing below said air channel and extending substantially at right angles to the direction of flow of the air through said channel, a U-shaped permanent magnet disposed substantially horizontally in said casing below said spindle, and a moving system comprising a vane, indicating means and a balancing segment pivotally mounted on said spindle, said vane extending into said channel and being disposed substantially transversely thereof and closing the major portion of said channel when in zero position, said indicating means indicating the range of deflection of said vane, said balancing segment depending below said vane and lying substantially at right angles thereto and moving between the pole extremities of said permanent magnet.

5. In a portable air velocity meter of the class described, the combination of a casing, an air channel defined in said casing for directing an air flow therethrough, means for controlling the air flow through said channel, a moving system comprising a vane, indicating means and a balancing segment, said vane extending into said air channel in position to be deflected through a limited range of oscillatory movement by the velocity of the air flow through said channel, said indicating means indicating the range of deflection of said vane, said balancing segment depending below said vane and lying substantially at right angles thereto and substantially balancing said vane and indicating means, and a permanent magnet comprising pole extremities defining an air gap, said balancing segment moving through said air gap.

6. In a portable air velocity meter of the class described, the combination of a casing, inlet and outlet openings in said casing, an air channel in said casing extending between said openings, adjustable means actuatable from the exterior of said casing for controlling the effective area of one of said openings to adapt the meter to different ranges of velocities, a moving system comprising a vane and indicating means, said moving system being pivoted for oscillatory movement about an axis extending substantially at right angles to the direction of flow of the air through said channel, said vane extending into said channel and being disposed substantially transversely thereof and closing the major portion of said channel when in zero position, said indicating means indicating the range of deflection of said vane, said indicating means having multiple scale means cooperating therewith for giving different readings for different ranges of velocities, and means for damping the motion of said moving system magnetically.

7. In a portable air velocity meter of the class described, the combination of a casing, an air channel defined in said casing for directing an air flow therethrough, adjustable means controlling the air flow through said channel for adapting the meter to different ranges of velocities, a moving system in said casing comprising a vane and indicating means, said vane having oscillatory movement in said air channel about a pivot axis extending substantially at right angles to the direction of flow of the air through said channel, said indicating means indicating the range of deflection of said vane and comprising multiple scale means for giving different readings for different ranges of velocities, a designating device operating in conjunction with said adjustable controlling means for designating the scale of said multiple scale means to be read, and magnetic means for damping the motion of said moving system.

8. In a portable air velocity meter of the class described, the combination of a casing, inlet and outlet openings in opposite side walls of said casing and an air channel in said casing extending in substantially straight line between said openings, whereby said openings can be aligned with free atmospheric air currents for substantially unidirectional flow through said casing, a moving system comprising a pivoted vane, indicating means and a damping member on opposite sides of the pivot axis of the vane, said vane extending into said air channel in position to be deflected through a limited range of oscillatory movement by the velocity of the air flow through said channel and the general axis of said channel being spaced to one side of the pivot axis of said vane, said indicating means indicating the range of deflection of said vane, permanent magnet means comprising pole extremities defining an air gap and disposed on the side of said pivot axis opposite said air channel, said damping member moving through said air gap, a hair spring opposing motion of said moving system in one direction, and means for adjusting the zero position of said indicating means through said hair spring.

9. In a portable air velocity meter of the class described, the combination of a casing, an air channel defined in said casing for directing an air flow therethrough, a moving system in said casing comprising a vane, indicating means and a damping member, said vane being disposed substantially transversely in said air channel and having oscillatory movement therein about a pivot axis extending substantially at right angles to the direction of flow of the air through said channel, said indicating means indicating the range of deflection of said vane, a hair spring for restoring said moving system to zero position, and permanent magnet means in said casing comprising pole extremities defining an air gap, said damping member moving through said air gap and being constructed to exert different degrees of magnetic retardation to motion of said moving system in different angular positions of said moving system, whereby said damping member exerts minimum magnetic retardation when said moving system is in close proximity to its zero position.

10. In a portable air velocity meter of the class described, the combination of a casing, an air channel defined in said casing for directing an air flow therethrough, a moving system comprising a vane and indicating means, said moving system being pivoted for oscillatory movement about an axis extending substantially at right angles to the direction of flow of the air through said channel, said vane extending into said channel and being disposed substantially transversely thereof, said indicating means indicating the angular deflection of said vane, magnetic means for damping the motion of said moving system, including a part movable with said vane, and locking means for holding the moving system against motion comprising a member movable into engagement with the movable part of said magnetic damping means.

11. In an air velocity meter of the class described, the combination of a casing, an air channel defined in said casing for directing an air flow therethrough, a moving system comprising a vane, indicating means and a balancing segment, said vane extending into said air channel and positioned to be deflected through a limited range of oscillatory movement by the velocity of the air flow through said channel, said indicating means indicating the range of deflection of said vane, said balancing segment depending below said vane and lying substantially at right angles thereto and substantially balancing said vane and indicating means, a permanent magnet comprising pole extremities defining an air gap, said balancing segment moving through said air gap, and a movable wall defining a part of said air channel movable to different positions for changing one of the dimensions of said channel.

12. In a portable air velocity meter of the class described, the combination of a casing, an air channel defined in said casing for directing an air flow therethrough, a moving system in said casing comprising a vane, indicating means and a balancing segment, said vane extending into said air channel in position to be deflected through a limited range of oscillatory movement by the velocity of the air flow through said channel, said channel varying in cross-sectional area between different points of its length, whereby said vane in a low velocity position closes a greater proportion of said channel than it does in a high velocity position, said indicating means indicating the range of deflection of said vane, said balancing segment depending below said vane and lying substantially at right angles thereto and substantially balancing said vane and indicating means, and a permanent magnet in said casing comprising pole extremities defining an air gap, said balancing segment moving through said air gap.

13. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, a moving system in said casing comprising a vane, indicating means and a balancing segment, said moving system being pivoted for oscillatory movement about an axis extending substantially at right angles to the direction of flow of the air through said channel, said vane extending into said channel and being disposed substantially transversely thereof and closing the major portion of said channel in all positions thereof, said air channel varying in cross-sectional area between different points of its length, whereby said vane closes a greater proportion of the channel in a low velocity position than it does in a high velocity position, said indicating means indicating the range of deflection of said vane, said balancing segment depending below said vane and lying substantially at right angles thereto and substantially balancing said vane and indicating means, and a permanent magnet in said casing comprising pole extremities defining an air gap, said balancing segment moving through said air gap.

14. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially uni-directional flow through said casing, a vane pivoted for oscillatory movement about an axis extending substantially at right angles to the direction of flow of the air through said channel, said vane being disposed substantially transversely in said channel and closing approximately the entire cross-sectional area of said channel when in its zero position, said vane closing the major cross-sectional area of said channel in all positions thereof, said channel increasing in cross-sectional area towards the position of maximum deflection of said vane, indicating means indicating the angular deflection of said vane and comprising different scale data for different ranges of velocities, adjustable means for controlling the effective area of one of said openings to adapt the meter to different ranges of velocities, and designating means operating therewith for designating the scale data to be read.

15. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially uni-directional flow through said casing, a vane pivoted for oscillatory movement about an axis extending substantially at right angles to the direction of flow of the air through said channel, said vane being disposed substantially transversely in said channel and closing approximately the entire cross-sectional area of said channel when in its zero position, said vane closing the major cross-sectional area of said channel in all positions thereof, said channel increasing in cross-sectional area towards the position of maximum deflection of said vane, indicating means indicating the angular deflection of said vane, a conduit for adapting the meter to the measurement of fluid flow at a point removed from the meter, said conduit having an orifice at one end adapted to be inserted into the region of flow to be measured, detachable coupling means for coupling the other end of said conduit to said casing, the latter end of said conduit communicating with the inlet end of said channel when so coupled to the meter, and means for closing the remainder of the inlet end of said channel from communication with atmosphere when the meter is thus adapted to the measurement of flow conditions through said detachable conduit.

16. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially uni-directional flow through said casing, a vane pivoted for oscillatory movement about an axis extending substantially at right angles to the direction of flow of the air through said channel, said vane being disposed substantially transversely in said channel and closing approximately the entire cross-sectional area of said channel when in its zero position, said vane closing the major cross-sectional area of said channel in all positions thereof, said channel increasing in cross-sectional area towards the position of maximum deflection of said vane, indicating means indicating the angular deflection of said vane, adjustable means actuatable from the exterior of said casing for controlling the effective area of one of said openings to adapt the meter to different ranges of velocities, a conduit for adapting the meter to the measurement of fluid flow at a point removed from the meter, said conduit having an orifice at one end adapted to be inserted into the region of flow to be measured, detachable coupling means for coupling the other end of said conduit to said casing, the latter end of said conduit communicating with the inlet end of said channel when so coupled to the meter, and means for closing the remainder of the inlet portion of said channel from communication with atmosphere when the meter is thus adapted to the measurement of flow conditions through said detachable conduit.

17. In a portable air velocity meter of the class described, the combination of a casing, an air channel in said casing for directing an air flow therethrough, a vane disposed substantially transversely in said channel and having limited oscillatory movement therein about a pivot axis extending substantially at right angles to that portion of the channel through which said vane swings, said vane in its zero position being inclined from the vertical and closing approximately the entire cross-sectional area of said channel, said vane closing the major cross-sectional area of said channel in all positions, said channel increasing in cross-sectional area towards the position of maximum deflection of said vane, indicating means indicating the angular deflection of said vane, magnetic means for damping the motion of said indicating means, an extension conduit, means for detachably coupling one end of said conduit to said casing in communication with the inlet end of said channel, the other end of said conduit having an orifice therein for conducting exploring operations in velocity regions remote from said meter, and means for closing the remainder of the inlet portion of said channel from communication with atmosphere when the meter is thus used for the measurement of flow conditions through the instrumentality of said extension conduit.

18. In a portable air velocity meter of the class described, the combination of a casing, inlet and outlet openings in said casing, an air channel in said casing extending between said openings, a moving system comprising a pivoted vane, indicating means and a balancing segment, said vane extending into said air channel in position to be deflected through a limited range of oscillatory movement by the velocity of the air flow through said channel, said indicating means indicating the range of deflection of said vane, said balancing segment depending below both said vane and said air channel and lying substantially at right angles thereto and substantially balancing said vane and indicating means, and a permanent magnet comprising pole extremities defining an air gap.

19. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially uni-directional flow through said casing, a moving system in said casing comprising a vane and indicating means, and means for adapting the meter to the measurement of fluid flow within a closed duct or the like comprising a conduit adapted to have communication at one end with the inlet portion of said air channel and having its other end adapted to open into said duct, and means for closing the inlet opening of said casing from communication with atmosphere when the meter is thus adapted to the measurement of fluid flow within a closed duct or the like.

20. In a portable air velocity meter of the class described, the combination of a casing, an air channel extending in a substantially straight line through said casing, whereby said channel can be aligned with free atmospheric air currents and said currents can have substantially unidirectional flow through said casing, a vane in said channel pivoted for oscillatory movement about an axis extending substantially at right angles to the direction of flow of the air through said channel, indicating means indicating the angular deflection of said vane, said vane responding to free atmospheric air currents of relatively low velocity passing through said channel, extension means for adapting the meter to the measurement of fluid flow within a closed duct or in other velocity regions removed from the meter, comprising two conduits communicating with opposite ends of said channel, the other ends of said conduits having orifices therein adapted to be presented in different angular relations to the fluid flow in the velocity region being measured, and means associated with said air channel for closing off the inlet and outlet ends of said channel when said two conduits are in communication therewith.

21. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, a moving system in said casing comprising a vane and indicating means, means for adapting the meter to the measurement of fluid flow with a closed duct or the like comprising a conduit adapted to have communication at one end with the inlet portion of said air channel and having its other end adapted to open into said duct, and means carried by the casing for closing the inlet opening of said casing from communication with atmosphere when the meter is thus adapted to the measurement of fluid flow within a closed duct or the like.

22. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, a moving system in said casing comprising a vane and indicating means, means for adapting the meter to the measurement of fluid flow within a closed duct or the like comprising a conduit adapted to have communication at one end with the inlet portion of said air channel and having its other end adapted to open into said duct, and means carried by the casing against said opposite side walls for closing both said inlet and outlet openings of the casing from communication with atmosphere when the meter is thus adapted to the measurement of fluid flow within a closed duct or the like.

23. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, means carried by the casing and serving as a lower wall for the inlet portion of said air channel, a moving system in said casing comprising a vane and indicating means pivoted for movement about an axis spaced below said wall means, and a curved part carried by said vane and arcuate about said axis so as to cooperate with said wall means so as to restrict air leakage from the inlet portion of said air channel.

24. In a portable air velocity meter of the class described, the combination of a casing, inlet and outlet openings in opposite side walls of said casing, an air channel in said casing extending in a substantially straight line between said openings, whereby said openings can be aligned with free atmospheric air currents and said currents can have substantially unidirectional flow through said casing, means serving as a lower wall for the inlet portion of said air channel, a moving system in said casing comprising a vane and indicating means pivoted for swinging movement about an axis below said wall means, said vane including a substantially flat section closing approximately the entire cross-sectional area of said air channel and having a laterally bent section with a portion curved arcuately about said pivot axis and cooperating with the inner end of said wall means in all positions of the vane for the purpose of preventing air leakage at this point, and balancing means for said vane.

25. In an air velocity meter of the class described, the combination of a casing, an air channel defined in said casing for directing an air flow therethrough, a moving system comprising a vane, indicating means and a balancing segment, said vane extending into said air channel and positioned to be deflected through a limited range of oscillatory movement by the velocity of the air flow through said channel, said indicating means indicating the range of deflection of said vane, said balancing segment depending below said vane and lying substantially at right angles thereto and substantially balancing said vane and indicating means, means for closing the ends of said air channel, and means operable therewith and movable into and out of engagement with said balancing segment for holding the moving system against motion.

26. In an air velocity meter of the class described, the combination of a casing, an air channel defined in the upper portion of said casing for directing an air flow therethrough, a moving system comprising a vane, indicating means and a balancing segment, said vane extending into said air channel and positioned to be deflected through a limited range of oscillatory movement by the velocity of the air flow through said channel, said indicating means indicating the range of deflection of said vane, said balancing segment depending below said vane and lying substantially at right angles thereto and substantially balancing said vane and indicating means, shutter means for closing the inlet end of said air channel and including a portion extending into the lower part of said casing, and a locking member in the lower portion of said casing and movable into engagement with said balancing segment, said locking member being operatively connected with the lower portion of said shutter means.

JOHN R. BOYLE.

CERTIFICATE OF CORRECTION.

Patent No. 2,060,848.                                              November 17, 1936.

JOHN R. BOYLE.

It is hereby certified that error appears in the printed specification of the above numbered patent requiring correction as follows: Page 7, second column, line 50, claim 8, after the word "in" insert a; page 9, second column, line 28, claim 18, after "gap" and before the period insert the comma and words , said balancing segment moving through said air gap; and that the said Letters Patent should be read with these corrections therein that the same may conform to the record of the case in the Patent Office.

Signed and sealed this 23rd day of February, A. D. 1937.

(Seal)

Henry Van Arsdale
Acting Commissioner of Patents.